(12) United States Patent
Simon

(10) Patent No.: US 11,741,919 B2
(45) Date of Patent: Aug. 29, 2023

(54) PERMANENT DATA INDICATOR, PERMANENT-DATA-INDICATOR-MANAGING AND -ADAPTING METHODS, TERMINAL USING SAME

(71) Applicant: ORANGE, Issy-les-Moulineaux (FR)

(72) Inventor: Pierre-Henri Simon, Lannion (FR)

(73) Assignee: ORANGE, Issy-les-Moulineaux (FR)

( * ) Notice: Subject to any disclaimer, the term of this patent is extended or adjusted under 35 U.S.C. 154(b) by 160 days.

(21) Appl. No.: 15/937,094

(22) Filed: Mar. 27, 2018

(65) Prior Publication Data

US 2018/0277066 A1    Sep. 27, 2018

(30) Foreign Application Priority Data

Mar. 27, 2017  (FR) ..................... 1752512

(51) Int. Cl.
*G09G 5/36* (2006.01)
*G06F 9/451* (2018.01)
*H04L 67/12* (2022.01)
*H04W 4/50* (2018.01)
*H04W 4/18* (2009.01)
(Continued)

(52) U.S. Cl.
CPC ............. *G09G 5/363* (2013.01); *G06F 9/451* (2018.02); *H04L 67/12* (2013.01); *H04L 67/75* (2022.05); *H04M 11/08* (2013.01); *H04M 19/048* (2013.01); *H04W 4/18* (2013.01); *H04W 4/38* (2018.02); *H04W 4/50* (2018.02); *G06F 2203/04803* (2013.01); *G09G 2320/0666* (2013.01); *G09G 2320/10* (2013.01);
(Continued)

(58) Field of Classification Search
CPC ..... G09G 5/363; H04L 67/36; G06F 3/04842; G06F 2221/2151; G06Q 50/01; G06Q 30/0643
See application file for complete search history.

(56) References Cited

U.S. PATENT DOCUMENTS 10,152,197 B1 * 12/2018 Xue .................. G06F 9/453
2003/0164862 A1   9/2003 Cadiz et al.
(Continued)

FOREIGN PATENT DOCUMENTS

WO    2016022205 A1    2/2016

OTHER PUBLICATIONS

French Search Report dated Sep. 25, 2017 for corresponding French Application No. 1752512, filed Mar. 27, 2017.

*Primary Examiner* — Samantha (Yuehan) Wang
(74) *Attorney, Agent, or Firm* — David D. Brush; Westman, Champlin & Koehler, P.A.

(57) ABSTRACT

A permanent data indicator and managing and adapting methods are provided. In particular, the permanent indicator is a pictogram permanently present on a screen of a terminal in active mode. The permanent indicator relates to a second datum and being able, furthermore, to form a permanent indicator relating to a first datum distinct from the second datum, the first datum being delivered by a first process implemented by the terminal. Thus, a given indicator is able to permanently inform the user of an active terminal of the value of the distinct datum, for example the permanent pictogram of a clock will indicate the time but also the time remaining to the next alarm, the weather forecast for the next 12 or 24 hours, air-quality, etc. The management of the permanent indicators will therefore be optimized.

16 Claims, 3 Drawing Sheets

(51) Int. Cl.
*H04W 4/38* (2018.01)
*H04M 19/04* (2006.01)
*H04M 11/08* (2006.01)
*H04L 67/75* (2022.01)
*H04M 1/72472* (2021.01)

(52) U.S. Cl.
CPC ..... *G09G 2340/04* (2013.01); *H04M 1/72472* (2021.01); *H04M 2250/12* (2013.01)

(56) References Cited

U.S. PATENT DOCUMENTS

| | | | |
|---|---|---|---|
| 2005/0154796 A1* | 7/2005 | Forsyth | H04M 1/72522 710/1 |
| 2012/0101952 A1* | 4/2012 | Raleigh | G06Q 30/016 705/304 |
| 2016/0206252 A9* | 7/2016 | McKeown | A61B 5/029 |
| 2017/0109011 A1* | 4/2017 | Jiang | G06F 1/1694 |

* cited by examiner

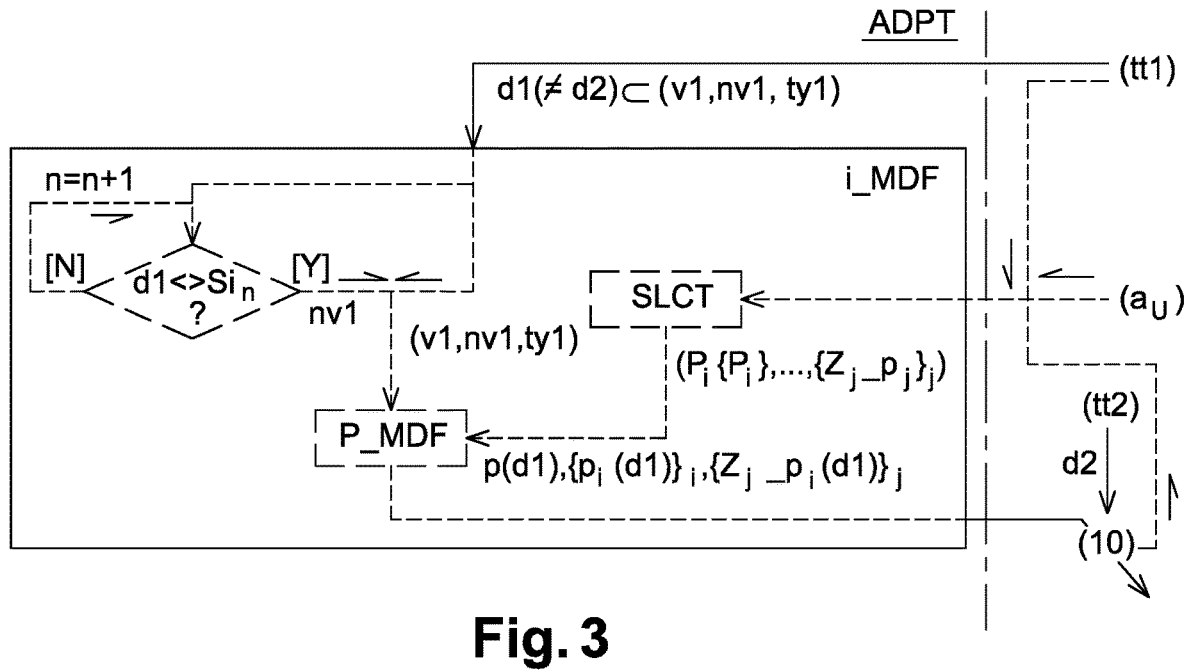
Fig. 3
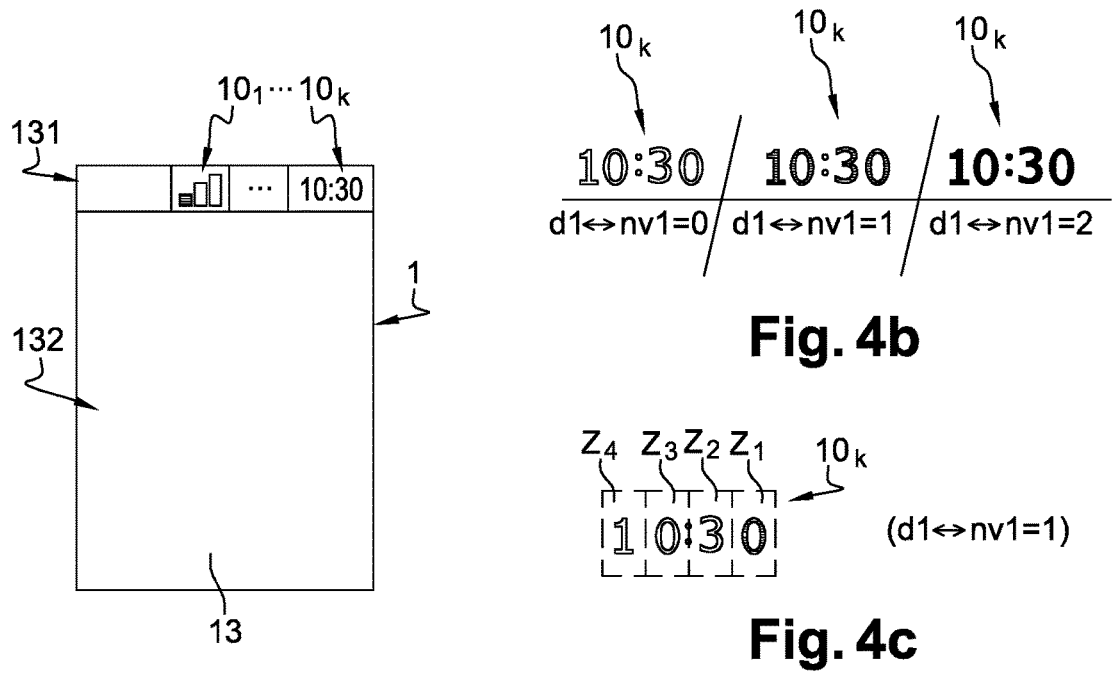
Fig. 4a
Fig. 4b
Fig. 4c

PERMANENT DATA INDICATOR, PERMANENT-DATA-INDICATOR-MANAGING AND -ADAPTING METHODS, TERMINAL USING SAME

CROSS-REFERENCE TO RELATED APPLICATIONS

This application claims priority to and the benefit of French Application No. FR1752512, filed Mar. 27, 2017, the content of which is incorporated herein by reference in its entirety.

FIELD OF THE DISCLOSURE

The invention relates to a permanent data indicator, to a permanent-data-indicator-managing method, to a permanent-data-indicator-adapting method, to a method for implementing a process by a terminal, to a program and to a terminal using same. In particular, the permanent indicator is a pictogram permanently present on a screen of a terminal in active mode.

BACKGROUND OF THE DISCLOSURE

Manufacturers of cell phones have made provision, in their terminals, for a bar of pictograms, on which bar are displayed permanent pictograms corresponding to a number of limited parameters of the telephone: clock, battery, mobile network, Wi-Fi network, etc. These pictograms are bearers of a single datum, the time for the clock, remaining power for the battery, quality of the network for the mobile and Wi-Fi networks, etc.

Terminals, in particular smart phones and tablets, are implementing an always larger number of applications. Certain of these applications are information applications: weather forecast, air-quality: pollution, pollen, transportation, stock exchanges, security, etc.; applications related to connected objects: control of openings of the home, management of the garden, household tasks, etc.; etc. The user of the smart phone sometimes has difficulty finding data or applications that are important to him in order to be able to use them even if widgets allow a faster link since they do not require the application to be opened.

In order to allow the user to find a datum originating from an application more easily, certain applications use the bar of pictograms to display in some way a pictogram relating to a datum originating from the application. These pictograms are displayed only occasionally because the pictogram bar is very limited. Thus the pictogram will generally be used to signal an event or a notification: incoming message, programmed alarm, application window open, a downloaded file, etc. The user then knows that a datum is available, the application from which it originated (depending on the displayed pictogram) but has no idea of its value unless he is the direct origin of the notification: in particular in the case of certain downloads, if he had programmed only a single alarm, etc.

It could be envisioned for the occasional pictogram to bear a value of a datum, just like the permanent battery or network pictograms that use bars with two color levels to indicate the available power with respect to the network and to the battery, respectively. Thus, for example, an alarm pictogram would indicate the remaining time to the trigger of the next alarm, a download information item the percentage of data downloaded, etc.

SUMMARY

One of the aims of the present invention is to remedy the drawbacks of the prior art with respect to the prior art.

One subject of the invention is a permanent indicator of a second datum implemented by a terminal, the permanent indicator being able, furthermore, to form a permanent indicator relating to a first datum distinct from the second datum, the first datum being delivered by a first process implemented by the terminal.

Thus, a given indicator will be able to permanently inform the user of an active terminal of the value of the distinct datum, for example the permanent pictogram of a clock will indicate the time but also the time remaining to the next alarm, the weather forecast for the next 12 or 24 hours, air-quality, etc.

One subject of the invention is also a method for managing a permanent indicator of a second datum, the permanent indicator being implemented by a terminal, the permanent-indicator-managing method including an adaptation of the permanent indicator of the second datum depending on a first datum distinct from the second datum, the first datum being delivered by a first process implemented by the terminal.

Thus, the management of permanent indicators is optimized, allowing a user to receive more data thereby.

One subject of the invention is also a method for adapting a permanent indicator of a second datum, the permanent indicator being implemented by a terminal, the indicator-adapting method including a modification of the permanent indicator depending on a first datum distinct from the second datum, the first datum being delivered by a first process implemented by the terminal.

Thus, the permanent indicator is able to provide a user with information on a plurality of data at least one datum of which does not relate directly to the terminal but to an application implemented by the terminal. Furthermore, the permanent indicator is able to provide information on a variation in this datum.

Advantageously, the modification of the permanent indicator includes a modification of a parameter of the permanent indicator of the second datum depending on a first datum delivered by a first process implemented by the terminal.

Thus, the indicator will not necessarily reproduce these two data but will possibly indicate, via a shape, a color, etc. the value of one, the one or even both indicator data. For example, the color will indicate the value of one of the two data: blue for a good air-quality, white for an average quality, grey for a poor quality, and the shape will indicate the time.

Advantageously, the second datum is delivered by a second process implemented by the terminal distinct from the first process.

Thus, the invention allows the indicator to bear:
two data form one and the same process: a home-automation process delivering the weather of the house and the position of its openings, or
two data from distinct processes: the time delivered by the clock and the air-quality delivered by a pollution-monitoring application.

Advantageously, the permanent-indicator-adapting method includes a comparison of the first datum with respect to at least one indication threshold, the result of the comparison controlling the modification of a parameter of the permanent indicator.

Thus, the indicator may delivered the data in the form of (vertical, horizontal, etc.) bars representing proportions of the value of the data or of levels of values rather than a gradual representation. Such a level wise indicator will be more easily readable and usable.

Advantageously, the first datum includes at least one of the following values:
  a value of a datum delivered by the first process,
  a result of a comparison of a value of a datum delivered by the first process to at least one indication threshold.

Thus, when the indicator bears a result of a comparison of the first datum, the comparison may be carried out by the process or the permanent-indicator management, allowing the processing load on the permanent-indicator management or on the process to be lightened, respectively.

Advantageously, when the permanent indicator includes a user interface of the second datum divided into a plurality of portions, the modification of a parameter of the permanent indicator consists at least in one of the following modifications:
  modification of a parameter of a single of the portions of the user interface of the permanent indicator,
  modification identically of the same parameter of a plurality of portions of the user interface of the permanent indicator,
  modification distinctly of the same parameter of a plurality of portions of the user interface of the permanent indicator,
  modification of distinct parameters of a plurality of portions of the user interface of the permanent indicator.

Thus, a given datum may be coded into a plurality of parameters on the indicator allowing errors in the comprehension of the datum delivered by the indicator to be avoided.

Advantageously, the permanent-indicator-adapting method includes a selection of a parameter of the permanent indicator among the parameters of the permanent indicator depending on the type of the first datum, the modification being made to the selected parameter depending on a value of the first datum.

Thus, the parameter of the permanent indicator used to bear the first datum is not always the same. This parameter may be selected randomly by the permanent indicator, or depending on a command of the first process, or by the user of the terminal.

Advantageously, one of the parameters of the permanent indicator is a shape parameter of a pictogram.

Advantageously, the modified parameter of the permanent indicator is at least one of the following parameters:
  a color parameter;
  a shape parameter;
  a size parameter;
  a link parameter.

Yet another subject of the invention is a method for implementing a first process by a terminal, the method for implementing the first process including a modification of a permanent indicator of a second datum depending on a first datum distinct from the second datum, the first datum being delivered by a first process implemented by the terminal and the permanent indicator being implemented by the terminal.

Advantageously, according to one implementation of the invention, the various steps of a method according to the invention are implemented by a software package or computer program, this software package comprising software instructions intended to be executed by a data processor of a terminal and being designed to control the execution of the various steps of this method.

The invention therefore also pertains to a program comprising program code instructions for executing the steps of the method for managing a permanent indicator, or of the method for adapting an indicator or of the method for implementing a first process when said program is executed by a processor.

This program may use any programming language and take the form of source code, object code or of a code intermediate between source code and object code such as code in a partially compiled form or in any other desirable form.

One subject of the invention is a terminal including:
  a permanent indicator of a second datum by a terminal, the permanent indicator being able, furthermore, to form a permanent indicator relating to a first datum distinct from the second datum; and
  a processor implementing a first process delivering the first datum.

BRIEF DESCRIPTION OF THE DRAWINGS

The features and advantages of the invention will become more clearly apparent on reading the description, which is given by way of example, and the figures that relate thereto, which show.

DETAILED DESCRIPTION OF ILLUSTRATIVE EMBODIMENTS

By permanent indicator, what is meant is a device able to indicate a quantity relating to a datum.

The permanent indicator is implemented by the terminal, i.e. in the status bar 131 of the terminal, as illustrated by FIG. 4A, or in the form of an icon on the home screen of the terminal.

The various presented embodiments may be implemented separately or together.

Figure 1:
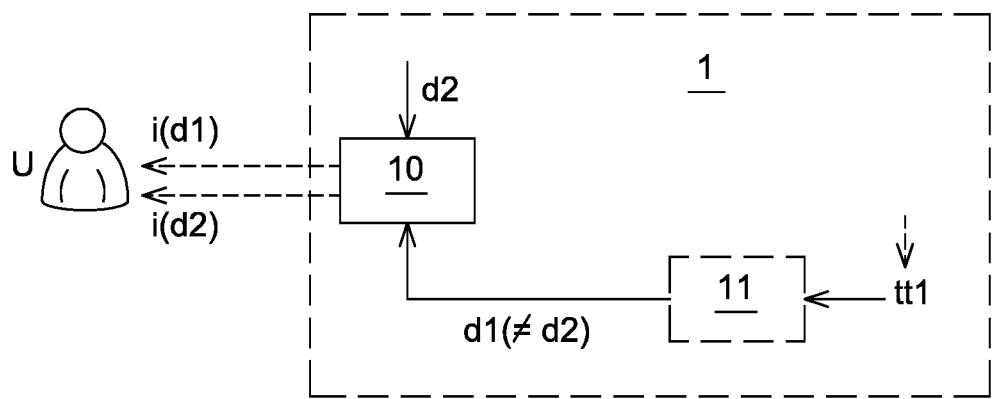
FIG. 1, a simplified schematic of a permanent indicator according to the invention, FIGS. 2a and 2b, simplified schematics of a method for managing a permanent indicator according to the invention and of a method for implementing a first process according to invention, respectively, FIG. 3, a simplified schematic of a method for adapting a permanent indicator according to the invention, FIGS. 4a, 4b and 4c, simplified schematics of an interface of a permanent indicator according to the invention, respectively implemented in a terminal according to the invention, of examples of adaptation of the permanent indicator depending on the first datum, and of examples of adaptation of a portion of the permanent indicator depending on the first datum, FIGS. 5a, 5b, 5c, 5d and 5e, simplified schematics of an interface of a permanent indicator depending on various values of the second datum, for FIGS. 5a to 5c, and of one (FIG. 5d) or more first data (FIG. 5e) delivered by a first process and/or the second process delivering the second datum, at least one datum of which relates to air pollution.

FIG. 1 illustrates a simplified schematic of a permanent indicator, according to the invention, of a second datum on a terminal.

A permanent indicator 10 of a second datum d2 is an indicator delivering, in at least one mode of the terminal 1, at least one type of information relating to the second datum to a user U of a terminal 1 implementing the permanent indicator such that the user U has, at any moment, information relating to the second datum d2 that is exact. In order to ensure this permanence of the indicator 10, either the permanent indicator 10 continuously delivers the information relating to the second datum d2, or the permanent indicator 10 repeatedly delivers the information relating to the second datum d2.

Furthermore, the permanent indicator 10 functions, in particular, only when the terminal 1 is in active mode. It may also be envisioned for the permanent indicator 10 to function both in active mode and in standby mode.

The delivery of the information relating to the second datum d2 to a user U of the terminal 1 is in particular carried out by the permanent indicator 10 by reproduction of this information relating to the second datum d2, by transmission to the user U of an alert signal depending on the second datum d2, etc. For example, the permanent indicator 10 includes a user interface U or controls a user interface U of a terminal 1 in order to deliver information to a user U of the terminal 1.

The permanent indicator 10 is furthermore able to form a permanent indicator relating to a first datum d1 distinct from the second datum d2. The first datum d1 is delivered by a first process tt1 implemented by the terminal 1.

Thus, the same permanent indicator 10 delivers information relating to two distinct data d1 and d2, either permanently, or indeed simultaneously when the delivery is carried out continuously.

FIG. 1 shows a permanent indicator 10 receiving both a first datum delivered by a first process tt1 implemented by a terminal 1 and a second datum, the first and second data being distinct. The permanent indicator 10 permanently transmits information relating to the first datum i(d1) and information relating to the second datum i(d2) to a user U of the terminal 1.

The use of a permanent indicator rather than an additional indicator to deliver to the user the first datum facilitates the permanence of the delivery of the first datum without requiring intervention by the user.

Optionally, a terminal 1 includes:
a permanent indicator 10 of a second datum d2 by the terminal 1, the permanent indicator 10 being able, furthermore, to form a permanent indicator relating to a first datum d1 distinct from the second datum d2, and
a processor 11 implementing a first process tt1 delivering the first datum d1.

In one particular embodiment, the first process tt1 is:
either a process generating the first datum d1;
or a process for accessing data including the first datum d1, these data either being stored or generated or captured by the terminal 1 or being located in a device for delivering data such as a hard disk, a USB key, a deliverer of data in a communication network to which the terminal 1 is connected either directly or via a fixed or mobile, remote or local, wireless or wired communication network, etc.
or a process for receiving data including the first datum d1 originating either from one or more sensors of the terminal 1, from a device for generating or capturing data to which the terminal 1 is connected either directly or via a fixed or mobile, remote or local, wireless or wired communication network, etc.

In one particular embodiment, the second datum is delivered either directly by the terminal 1 (clock, charge of the battery, power of a network, etc.), or by a sensor of the terminal 1, or by a second process tt2 implemented by the terminal 1.

In one particular embodiment, the second process tt2 is:
either a process generating the second datum d2;
or a process for accessing data including the second datum d2, these data either being stored or generated or captured by the terminal 1 or being located in a device for delivering data such as a hard disk, a USB key, a deliverer of data in a communication network to which the terminal 1 is connected either directly or via a fixed or mobile, remote or local, wireless or wired communication network, etc.
or a process for receiving data including the second datum d2 originating either from one or more sensors of the terminal 1, from a device for generating or capturing data to which the terminal 1 is connected either directly or via a fixed or mobile, remote or local, wireless or wired communication network, etc.

Thus, the invention makes it possible to use, or even to overload, a permanent indicator, the interface, of a terminal, in particular of a cell phone, in particular using a permanent pictogram to convey an additional datum, for example on air-quality.

In particular, the permanent indicator of a second datum is implemented in a status bar of a terminal. The permanent indicator implemented in the status bar of the terminal is furthermore able to form a permanent indicator relating to a first datum distinct from the second datum, the first datum being delivered by a first process implemented by the terminal.

By status bar, what is in particular meant is a display bar (for example at the top of the screen of the terminal) delivering terminal data, in particular system and/or connectivity data, such as the time, the level of charge of the battery of the terminal, the power of the transmission signal of the terminal, etc.

Figure 2A:
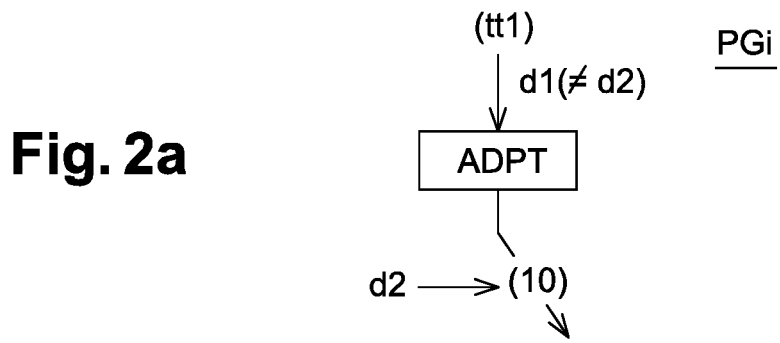

FIG. 2a illustrates a simplified schematic of a method for managing a permanent indicator according to the invention.

The method PGI for managing a permanent indicator of a second datum includes an adaptation ADPT of the permanent indicator of the second datum 10 depending on a first datum d1 distinct from the second datum d2. The first datum d1 is delivered by a first process tt1 implemented by the terminal 1.

An adaptation ADPT implemented by the permanent-indicator-managing method PGI of FIG. 2a is in particular illustrated by FIG. 3.

In one particular embodiment, the method for managing a permanent indicator is implemented by a program comprising program code instructions for executing steps of the method for managing a permanent indicator when said program is executed by a processor.

In particular, the managing method furthermore includes, apart from the adaptation, other processes such as parameterization of the position of the permanent indicator in particular dependent on user choice or automatically in order to optimize for example the zone of display of the permanent indicators.

Figure 2B:
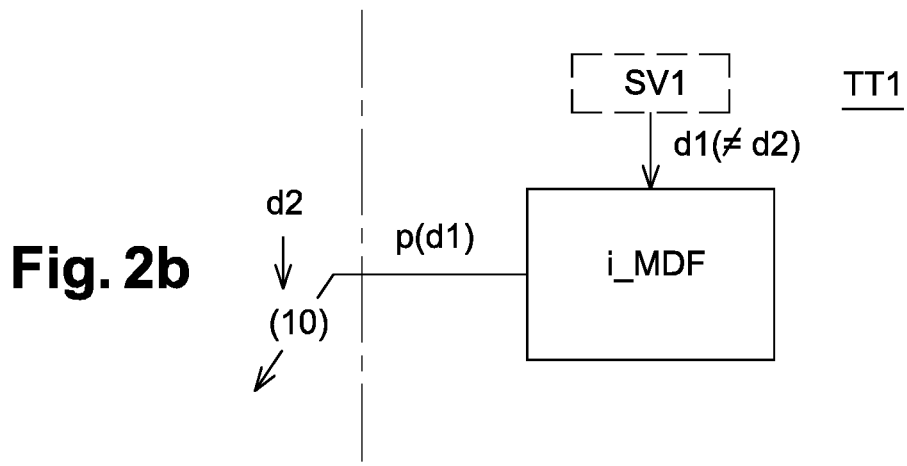

FIG. 2b illustrates a simplified schematic of a method for implementing a first process according to the invention.

The method for implementing the first process TT1 includes a modification I_MDF of a permanent indicator 10 of a second datum depending on a first datum d1 distinct from the second datum d2. The first datum d1 is delivered by a first process TT1 implemented by the terminal. The permanent indicator 10 being implemented by the terminal 1.

A modification I_MDF of a permanent indicator of a second datum implemented by the method for implementing the first process TT1 of FIG. 2b is in particular illustrated by FIG. 3.

The first process TT1 includes, in particular, an implementation of a service SV1 delivering the first datum. The implementation of the service SV1 is for example, capture of data, and/or access of data stored in the terminal, in a device for delivering data, and/or generation of data, etc.

In one particular embodiment, the method for managing a permanent indicator is implemented by a program comprising program-code instructions for executing steps of the method for implementing a first process when said program is executed by a processor.

Optionally, the method for implementing the first process may deliver other information than the value of the datum used to modify the indicator. For example, a first process such as a weather-forecast application may furthermore allow other data than that provided by the permanent indicator to be accessed: weather of other places, at other times (day, times of day), other metrological data: rainfall, wind speed, etc., when the weather-forecast application is opened.

FIG. 3 illustrates a simplified schematic of a method for adapting a permanent indicator according to the invention.

The method allowing adaption ADPT of a permanent indicator of a second datum includes a modification I_MDF of the permanent indicator 10 depending on a first datum d1 distinct from the second datum d2. The first datum d1 is delivered by a first process tt1 implemented by a terminal 1.

In particular, the modification I_MDF of the permanent indicator includes a modification of a parameter P_MDF of the permanent indicator of the second datum depending on a first datum d1 delivered by a first process tt1 implemented by the terminal 1.

In particular, the second datum d2 is delivered by a second process tt2 implemented by the terminal 1. The second process tt2 is, in particular, distinct from the first process tt1.

In particular, the method allowing adaptation ADPT of a permanent indicator includes a comparison d1< >Sln ? of the first datum d1 with respect to at least one indication threshold Sln, the result of the comparison nv1 controlling the modification P_MDF of a parameter of the permanent indicator. In particular, the modification I_MDF of a permanent indicator includes this comparison d1< >Sln ?.

In particular, the first datum d1 includes at least one of the following values:
  a value v1 of a datum delivered by the process tt1,
  a result of a comparison nv1 of a value of a datum delivered by the first process tt1 to at least one indication threshold.

Furthermore, the first datum d1 in particular includes a denomination ty1 relating to the datum: its name, its type, etc.

In particular, when the permanent indicator 10 includes a user interface of the second datum divided into a plurality of portions Zj, the modification P_MDF of the permanent indicator consists at least in one of the following modifications:
  modification of a parameter of a single of the portions of the user interface of the permanent indicator Zj_pi(d1),
  modification identically of the same parameter of a plurality of portions of the user interface of the permanent indicator {Zj_pi(d1)=f(d1)}j,
  modification distinctly of the same parameter of a plurality of portions of the user interface of the permanent indicator {Zj_pi(d1)=fj(d1)}j,
  modification of distinct parameters of a plurality of portions of the user interface of the permanent indicator {Zj_pi(d1)=fij(d1)}ij.

In particular, the method allowing adaptation ADPT of a permanent indicator includes a selection SLCT of a parameter p of the permanent indicator 10 among the parameters of the permanent indicator in particular depending on the type ty1 of the first datum. The modification P_MDF will be carried out on the selected parameter p(d1) depending on a value of the first datum.

In particular, one of the parameters of the permanent indicator is a shape parameter of a pictogram. Thus, the user interface when it is a question of a screen or of a display interface will receive, depending on the second datum, a signal including a shape parameter of a pictogram making it possible to transmit to the user at least the type of the second datum: a clock pictogram for an alarm, a battery for charge information, arcs of circles forming a cone in order to represent the power of the network, or even, furthermore, a value of the second datum: display of the time (this corresponding both to the type of datum: clock, and to the value of the datum), etc.

In particular, in the case where the user interface is a display interface, or in the case where one of the parameters is a shape parameter of a pictogram, the modified parameter of the first datum d1 of the permanent indicator 10 is at least one of the following parameters:
  a color parameter;
  a shape parameter;
  a size parameter;
  a link parameter.

The link parameter in particular allows, when the user interacts with the permanent indicator, the permanent indicator to activate access, via the terminal, to an address stored in the link parameter. Thus, the user may obtain access to data that are complementary to the first datum delivered by the permanent indicator and/or to a parameterization of the modification of the permanent indicator by the first process: selection of a first datum among data delivered by the first process and/or selection of one or more parameters of the permanent indicator depending on the first datum and/or establishment of rules associating the value of the first datum with a value of a parameter of the permanent indicator.

The user interface may also be a haptic interface, i.e. with force feedback, or a vocal interface, etc. The parameters are then in particular: the power of the force feedback, the direction of the force feedback, the button or control pad with which the force feedback is associated; the vocal power, tonality, the sound or the word, the expression vocalized, etc.

In the case of a vocal interface, the permanent indicator will deliver the two data not necessarily continuously but at least repeatedly and optionally simultaneously.

A program comprising program-code instructions for executing steps of a method for adapting an indicator when said program is executed by a processor.

FIGS. 4a, 4b and 4c illustrate simplified schematics of an interface of a permanent indicator according to the invention.

FIG. 4a illustrates an interface of a terminal according to the invention implementing a least one permanent indicator.

The terminal 1 in particular includes a user interface 13 consisting, in the present case, of a touchscreen. In order for the user U to always be informed of certain data, the user interface 13 is divided into two portions: a bar of permanent indicators 131 (in particular a status bar) and a free screen 132. On the free screen 132, the user may optionally choose his wallpaper and/or add icons corresponding to the applications that they use. On the bar of permanent indicators 131, the terminal 1 systematically displays, and at every moment, at least in an active mode of the terminal, data such as the power of the network $10_1$ . . . the time $10_K$. The bar of permanent indicators 131 therefore corresponds to the user interfaces $10_1 \ldots 10_K$ of K permanent indicators of the terminal 1. These permanent indicators are generally imposed by the manufacturer of the terminal 1, and optionally by certain processes available on the terminal 1.

FIG. 4b shows examples of adaptation of a permanent indicator, in particular implemented by the terminal of FIG. 4a, depending on various values of the first datum.

For example, the user interface of the permanent indicator of the time 10K may be used to deliver to the user U a first datum d1 distinct from the second datum d2 that consists of the time.

In the example of FIG. 4b, the parameter of the displayed color of the permanent indicator is dependent on the first datum d1. In particular, when, following a comparison with respect to at least two thresholds, the permanent indicator determines that the level of the first datum nv1 is:

zero nv1=0, the parameter of the displayed color of the time is not modified, for example it is equal to a white or light (pale blue) color or a first hue (such as green);

equal to 1 nv1=1, the parameter of the displayed color of the time is modified, for example is made slightly darker in order in particular to become an in particular greyer color of mid hue (mid blue) or a second hue (such as yellow);

equal to 2 nv1=2, the parameter of the displayed color of the time is modified, for example it is made much darker in order to become a color of dark hue (navy blue) in particular a black color (or dark grey color perceptible on a black background) or a third hue (such as red).

FIG. 4c shows an example of adaptation of a portion of a user interface of a permanent indicator, in particular implemented by the terminal of FIG. 4a, dependent on a value of the first datum.

In our example, the user interface of the permanent indicator of the clock $10_K$ is divided into four portions Z1, Z2, Z3 and Z4. Depending on the first data, a parameter of one or more or even all of the four portions Z1, Z2, Z3 and Z4 of the user interface of the permanent indicator of the clock $10_K$ is modified. FIG. 4c shows the case where the level of the value of the first datum is equal to 1, only modifying the color parameter of the first zone Z1 of the user interface of the permanent indicator of the clock $10_K$.

In the case where the level of the value of the first datum is equal to 2, it could be envisioned for the adapting method according to the invention to modify the color parameter either only of the second zone Z2 or of the two first zones Z1 and Z2 of the user interface of the permanent indicator of the clock $10_K$. This reasoning may be reproduced for a value level equal to 3 and to 4.

FIGS. 5a, 5b, 5c, 5d and 5e illustrates simplified schematics of an interface of a permanent indicator.

Figure 5A:
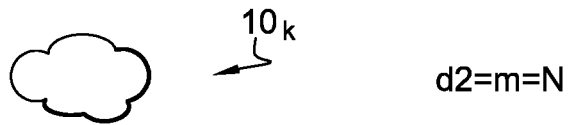
Figure 5B:
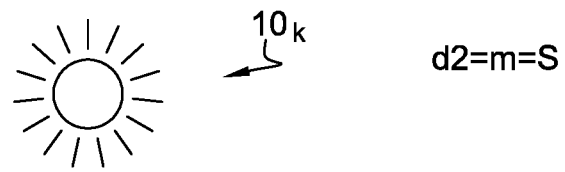
Figure 5C:
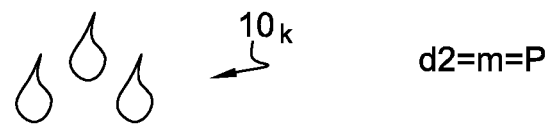

FIGS. 5a to 5c show an interface of a permanent indicator 10k of a second datum d2 for various values of a second datum d2=N, S, P, in the present case the second datum is a meteorological datum d2=m.

FIG. 5a shows the interface of the permanent indicator 10k of a meteorological datum d2=m for which the value is cloudy N. The permanent indicator 10k associates with the cloudy value N a cloud-type shape parameter as presented by FIG. 5a.

FIG. 5b shows the interface of the permanent indicator 10k of a meteorological datum d2=m for which the value is sunny S. The permanent indicator 10k associates with the sunny value N a sun-type shape parameter as presented by FIG. 5b.

FIG. 5c shows the interface of the permanent indicator 10k of a meteorological datum d2=m for which the value is rainy P. The permanent indicator 10k associates with the rainy value P a rain-drops-type shape parameter as presented by FIG. 5c.

Figure 5D:
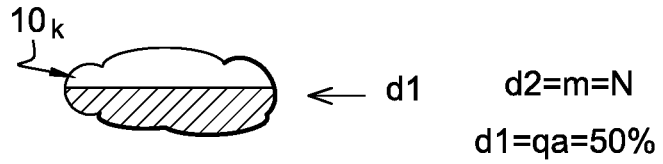

FIG. 5d shows an interface of a permanent indicator of a second datum, the indicator being adapted depending on a first datum relating to air pollution.

The second datum d2 is a meteorological datum m delivered either by a weather-forecast application of the terminal 1, or by sensors of the terminal 1. In this example, the value of the second datum is cloudy N. The shape parameter of the interface of the permanent indicator of the second datum is dependent on this second datum and therefore has a cloud shape.

The first datum d1 is an air-quality datum qa delivered either by sensors of the terminal 1 or by a pollution-related application implemented by the terminal 1. The air-quality qa in our example is 50%, i.e. corresponding to an average air-quality relative to air-quality values identified as good and bad.

The permanent indicator 10k modifies at least one parameter of its interface depending on the first datum d1. In the present case, a first parameter allows the shape corresponding to the second datum, i.e. the cloud, to be divided into two portions, the size of one of which is dependent on the value of the first datum. In the present case, the shape is divided into two portions, the size of the bottom portion being equal to 50% of the size of the shape, i.e. the same value as the air-quality delivered by the first datum. Optionally, a second parameter is modified depending on the first datum, for example the color parameter corresponding to the portion the size of which is dependent on the first datum.

Figure 5E:
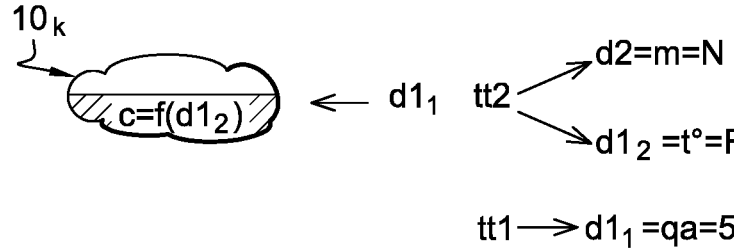

FIG. 5e shows an interface of a permanent indicator of a second datum, the indicator being adapted depending on a plurality of first data delivered by a first process and a second process delivering the second datum.

A second weather-forecast application delivers the second datum d2 is a delivered meteorological datum m. In this example, the value of the second datum is cloudy N. The shape parameter of the interface of the permanent indicator of the second datum is dependent on this second datum and therefore has a cloud shape.

Air-quality is an important datum that is regularly made available to the public via various media: television, radio, but also through certain dedicated applications. In order to gain access to this datum on a mobile telephone, it is currently necessary to navigate to a dedicated site or to personalize an alert. The user must therefore research information to obtain it.

A first datum $d1_1$ is an datum on air-quality qa delivered by a first process tt1: either by sensors of the terminal 1 or by a pollution-related application implemented by the terminal 1. The air-quality qa in our example is 50%, i.e. corresponding to an average air-quality relative to equality values identified as good and bad.

The permanent indicator 10k modifies at least one parameter of its interface depending on the first datum $d_{11}$. In the present case, a first parameter allows the shape corresponding to the second datum, i.e. the cloud, to be divided into two portions, the size of one of which is dependent on the value of the first datum. In the present case, the shape is divided into two portions, the size of the bottom portion being equal to 50% of the size of the shape, i.e. the same value as the air-quality delivered by the first datum $d_{11}$.

Another first datum $d_{12}$ may also be delivered either by the first process or by the second process as illustrated by FIG. 5e. In the example of FIG. 5e, the second process tt2, i.e. the weather-forecast application, delivers a second datum d2: a meteorological datum m and a first datum $d_{12}$: a temperature datum t°. A parameter of the interface of the permanent weather-forecast indicator 10k is modified depending on the temperature first datum $d_{12}$=t°. In particular, the value of the temperature t° is compared to thresholds in order to determine temperature levels: frost G, cold F, mild D, temperate, hot H, heatwave C, etc. In FIG. 5e, the level of the temperature t° is cold F. For example, the parameter of the color corresponding to the portion the size of which is dependent on the first datum d11 is modified depending on the other second datum d12: $c=f(d_{12})$. In our example, the color is blue for a cold temperature level F. It could be envisioned to attribute a white color to frost, a blue color to cold, a green color to mild, a yellow color to temperate, an orange color to hot and a red color to heatwave.

The invention is applicable to terminals in particular mobile terminals. It makes it possible to make permanent the delivery, to the user, of a first datum when it exists. Depending on the type of first datum, the terminal, another device or the user may draw conclusions as regards their behaviour. In the case of a first datum of air-quality type, the permanent indicator may lead to home-automation control of openings of a residence, a vehicle driving style, user activities optionally having a beneficial effect in terms of public health.

In the case where a link parameter is modified depending on a first datum corresponding to air-quality, the permanent indicator allows the user to access, for example, routes qualified in terms of air-quality: green route for the least polluted or for a route with a good air-quality allowing the user and/or a navigation application to suggest a sporting or transport itinerary to follow depending on the air-quality of the available itinerary options.

The invention also pertains to a medium. The data medium may be any entity or device capable of storing the program. For example, the medium may include a storage means, such as a ROM, for example a CD-ROM or a microelectronic-circuit ROM, or even a magnetic recording means, for example a floppy disk or a hard disk.

Furthermore, the data medium may be a transmissible medium such as an electrical or optical signal that may be conveyed via an electric or optical cable, via radio or by other means. The program according to the mention may in particular be downloaded over a network and in particular the Internet.

Alternatively, the data medium may be an integrated circuit into which the program is incorporated, the circuit being suitable for executing or for being used in the execution of the method in question.

In another implementation, the invention is implemented by means of software and/or hardware components. In this light, the term module may correspond either to a software component or to a hardware component. A software component corresponds to one or more computer programs, one or more sub-programs of a program, or, more generally, to any element of a program or of a software package able to implement a function or a set of functions according to the description below. A hardware component corresponds to any element of a hardware assembly able to implement a function or a set of functions.

Although the present disclosure has been described with reference to one or more examples, workers skilled in the art will recognize that changes may be made in form and detail without departing from the scope of the disclosure and/or the appended claims.

The invention claimed is:

1. A method comprising:
   displaying a graphical permanent indicator of a second parameter on a status bar of a physical display screen of a terminal, the graphical permanent indicator being displayed by the terminal as soon as the terminal is activated until the terminal is shutdown;
   adapting the graphical permanent indicator of the second parameter, including a modification of the graphical permanent indicator depending on a first parameter distinct from the second parameter, the first parameter being delivered by a process implemented by the terminal; and
   displaying simultaneously, on the graphical permanent indicator of the second parameter on the status bar of the physical display screen of the terminal, a graphical representation of a value of the first parameter and a graphical representation of a value of the second parameter.

2. The method according to claim 1, wherein the modification of the graphical permanent indicator includes a modification of a parameter of the graphical permanent indicator of the second parameter depending on the first parameter delivered by the first process implemented by the terminal.

3. The according to claim 1, wherein the second parameter is delivered by a second process implemented by the terminal distinct from the first process.

4. The method according to claim 1, further comprising comparing the first parameter with respect to at least one indication threshold, a result of the comparison controlling the modification of the parameter of the graphical permanent indicator including a modification of a parameter of the graphical permanent indicator.

5. The method according to claim 1, wherein the first parameter includes at least one of the following values:
   a value of the first parameter delivered by the first process,
   a result of a comparison of a value of the first parameter delivered by the first process to at least one indication threshold.

6. The method according to claim 1, wherein when the graphical permanent indicator includes a user interface of the second parameter divided into a plurality of portions, the modification of a parameter of the graphical permanent indicator comprises at least one of the following modifications:
   modification of a parameter of a single of the portions of the user interface of the graphical permanent indicator,
   modification identically of the same parameter of a plurality of portions of the user interface of the graphical permanent indicator,
   modification distinctly of the same parameter of a plurality of portions of the user interface of the graphical permanent indicator,
   modification of distinct parameters of a plurality of portions of the user interface of the graphical permanent indicator.

7. The method according to claim 1, further comprising selecting a parameter of the graphical permanent indicator among the parameters of the graphical permanent indicator depending on a type of the first parameter, the modification being made to the selected parameter depending on the value of the first parameter.

8. The method according to claim 1, wherein one of the parameters of the graphical permanent indicator is a shape parameter of a pictogram.

9. The method according to claim 8, wherein the modified parameter of the graphical permanent indicator is at least one of the following parameters:
- a color parameter;
- a shape parameter;
- a size parameter;
- a link parameter.

10. The method of claim 1, wherein the representation of the value of the first parameter is displayed within the representation of the value of the second parameter.

11. A method comprising:
- displaying a graphical permanent indicator of a second parameter on a status bar of a physical display screen of a terminal, the permanent indicator being displayed on a home screen of the terminal;
- implementing a first process by the terminal, delivering a first parameter distinct from the second parameter; and
- modifying the graphical permanent indicator of the second parameter depending on the first parameter;
- wherein a representation of a first value corresponding to the first parameter and a representation of a second value corresponding to the second parameter are simultaneously displayed on the graphical permanent indicator on the physical display screen.

12. The method of claim 11, wherein the representation of the value of the first parameter is displayed within the representation of the value of the second parameter.

13. A non-transitory computer-readable medium comprising program code instructions stored thereon which when executed by a processor configure the processor to perform acts comprising:
- displaying a graphical permanent indicator of a second parameter on a status bar of a physical display screen;
- implementing a first process, delivering a first parameter distinct from the second parameter; and
- modifying the graphical permanent indicator of the second parameter depending on the first parameter such that the graphical permanent indicator of the second parameter furthermore forms a graphical permanent indicator relating to the first parameter;
- wherein a representation of a first value corresponding to the first parameter and a representation of a second value corresponding to the second parameter are simultaneously displayed on the graphical permanent indicator on the display screen.

14. The non-transitory computer-readable medium of claim 13, wherein the representation of the value of the first parameter is displayed within the representation of the value of the second parameter.

15. A terminal including:
- a physical display screen;
- a processor; and
- a non-transitory computer-readable medium comprising instructions stored thereon, which when executed by the processor configure the terminal to perform acts comprising:
  - displaying a graphical permanent indicator of a second parameter on a status bar of the physical display screen;
  - implementing a first process delivering a first parameter distinct from the second parameter; and
    - modifying the graphical permanent indicator of the second parameter depending on the first parameter such that the graphical permanent indicator of the second parameter furthermore forms a graphical permanent indicator relating to the first parameter,
  - wherein a representation of a first value corresponding to the first parameter and a representation of a second value corresponding to the second parameter are simultaneously displayed on the graphical permanent indicator on the display screen.

16. The terminal of claim 15, wherein the representation of the value of the first parameter is displayed within the representation of the value of the second parameter.

* * * * *